Aug. 1, 1967  P. J. HENNEQUIN  3,333,905
BEARING DEVICE FOR A VENETIAN BLIND
Filed Nov. 12, 1964
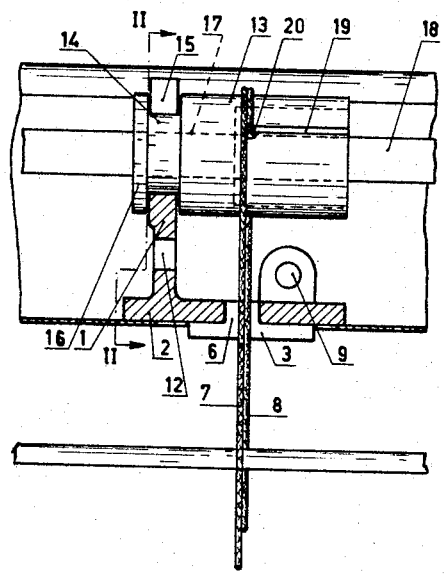
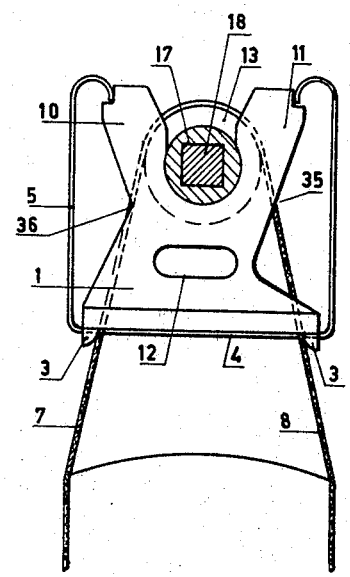
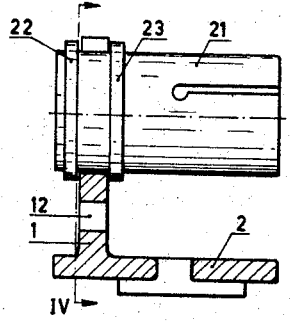
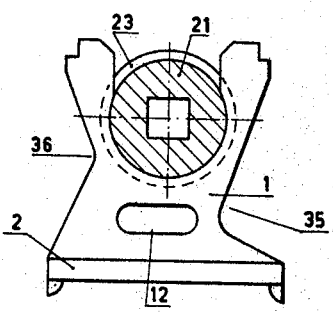
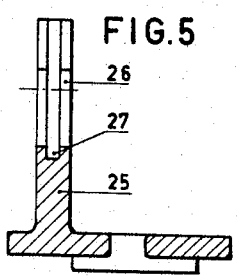
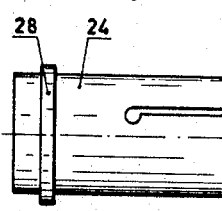
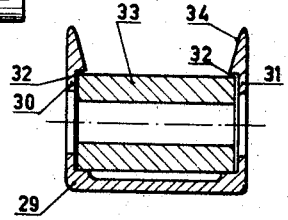
INVENTOR
Petrus J. Hennequin
BY
Stevens Davis Miller & Mosher
ATTORNEYS United States Patent Office 3,333,905
Patented Aug. 1, 1967

3,333,905
BEARING DEVICE FOR A VENETIAN BLIND
Petrus J. Hennequin, Rotterdam, Netherlands, assignor to Hunter Douglas International Ltd., Montreal, Quebec, Canada, a corporation of Quebec
Filed Nov. 12, 1964, Ser. No. 410,384
Claims priority, application Netherlands, Nov. 14, 1963, 300,512
7 Claims. (Cl. 308—15)

ABSTRACT OF THE DISCLOSURE

A bearing device for the operating shaft of a Venetian blind including a base member having at least one upstanding portion formed by two spaced resilient legs and a roller retainably mounted between the legs. The roller is provided with an axial passage to accommodate the operating shaft therein.

This invention relates to a bearing device for an operating shaft of a Venetian blind, said bearing device comprising a roller rotatably mounted in a bearing and having a hole for accommodating the operating shaft therein. The bearing is characterized by having resilient legs and means for supporting the roller, the smallest distance between the legs being less than the dimension of that part of the roller fitting therebetween. This bearing device presents the advantage that the operating shaft of a Venetian blind, with rollers, may be easily and rapidly mounted in place, since it is only necessary to press the shaft into the bearings, after which it cannot be readily displaced from said bearings, for example, during transport of the Venetian blind. This is of particular importance if the rollers provided in the operating shaft serve as tilt rods to which the ends of the loop of the Venetian blind ladders are fastened. This fastening of the ladders to the roller may thereby be effected outside the head rail of the Venetian blinds.

According to a preferred embodiment of the bearing device, the bearing device may have a substantially U shape, the smallest distance between the legs being less than the diameter of the roller. The legs of the U-shaped bearing device may have chamfered free ends, the smallest distance between the chamfered free ends being less than the diameter of the roller fitting between said legs.

The means for supporting the roller may consist of a recess or projection provided in or on each of the legs.

According to another embodiment of the bearing device, the bearing device may have substantially an L shape. In order that the roller be prevented from shifting with regard to the bearing device, it may be provided with an annular groove, the resilient legs gripping into the groove. Instead of a groove, the roller may also have an annular collar engaging with a groove of the bearing and the roller may be provided with a collar which grips in the groove. It is also possible to provide the roller with an annular collar lying at each side of the legs of the bearing device.

The invention will be further explained below with reference to the accompanying drawings showing by way of example some embodiments of the bearing device according to the invention.

FIG. 1 shows a first embodiment of this bearing device partly in longitudinal section and partly in view, said figure showing part of the head rail, of a ladder and of a lamella of a Venetian blind.

FIG. 2 is a section according to the line II—II of FIG. 1.

FIG. 3 shows a second embodiment partly in longitudinal section and partly in view.

FIG. 4 is a section according to the line IV—IV of FIG. 3.

FIGS. 5 and 6 show a bearing in section and a ladder roller in view of a third embodiment.

FIG. 7 shows diagrammatically a bearing device comprising a U-shaped bearing.

The device shown in the drawings comprises an L-shaped bearing 1 having a base 2 extending at a right angle to the bearing 1. The base 2 comprises at its bottom surface projections 3 projecting through an aperture 4 in a head rail 5 and abutting against the edges of said aperture. In the base 2 a gap 6 has been provided allowing the passage of the ladder cords 7, 8 of a ladder of a Venetian blind. Furthermore the base 2 is provided with a guide pulley 9 for a lift cord (not shown) of a Venetian blind, said lift cord passing through the gap 6 of the base 2. In the bearing 1 below the legs 10, 11 an aperture 12 has been provided allowing a lift cord to be passed therethrough.

Between the legs 10, 11 of the bearing an accommodation space has been provided for a cylindrical ladder roller 13. The passage for the portion of the ladder roller 13 which is to be introduced in said accommodation space is smaller than the diameter of said ladder roller portion. In consequence of the fact that the bearing is manufactured from somewhat resilient material the ladder roller may be snapped in place in the accommodation space of the bearing 1 and in this way the ladder roller is prevented from leaving said accomodation space unintentionally.

In the accommodation space of the bearing, a portion 14 of the ladder roller is located, said portion having a smaller diameter than this ladder roller 13. Said thinner portion 14 of the ladder roller has been formed by providing in this ladder roller an annular groove 15. As a result on one side of this groove a collar 16 is formed situated against one side of the bearing 1, the thicker portion of the ladder roller 13 being situated against the other side of the bearing. Consequently a lateral displacement is prevented and furthermore the ladder roller is prevented from assuming an oblique position.

A square tilt rod 18 is passed through a square hole 17 extending over part of the length of the ladder roller 13. This hole terminates in a larger hole. The ladder roller 13 has a relatively thin wall surrounding the larger hole in which there are slots 19 for fastening the ladder cords 7, 8. These slots terminate in holes 20. The ladder cords 7 and 8 are slid so far into these slots 19 that they are located in the holes 20. As a result thereof said ladder cords are in the correct position over the gap 6 in the base 2. In order to prevent the ladder cords from being drawn out of said holes 20 a knot may be tied in the end of said ladder cords.

In the embodiment according to FIGS. 3 and 4 the bearing 1 with its base 2 has been constructed in the same way as the bearing 1 and the base 2 of the embodiment according to FIGS. 1 and 2. However, the ladder roller 21 does not have a thinner portion but it comprises two annular collars 22, 23 located on either side of the bearing 1. The rest of this embodiment corresponds with the embodiment shown in FIGS. 1 and 2. The embodiment according to FIGS. 5 and 6 differs from the two embodiments described above in that in the accommodation space 26 of the bearing 25 destined for the ladder roller 24, a groove 27 has been provided with which a collar 28 provided on the ladder roller 24 engages so that consequently this ladder roller is held in place.

FIG. 7 shows a bearing device having a U-shaped bearing 29 of which each of the erect portions 30, 31 form a recess 32 with which the ends of a roller 33 engage. The upper portion 34 of each of the erect portions 30, 31 has been chamfered so that the roller 33 may be easily mounted in place. The introduction of the bearing device in place in the head rail is facilitated by the shape of the re-entered sides 35 and 36 which, moreover, also in the case of less resilient material ensure a satisfactory deformability of the legs 10 and 11.

It is obvious that the invention is not restricted to the embodiments described above by way of example and shown in the drawings but that these may be modified in many ways without departing from the scope of the invention. The bearing device may be utilized for a tilt rod as well as for a winding shaft for the lift cords of a Venetian blind, curtain or similar screen. In the case of bearing devices destined for the end of an operating shaft the hole in the roller need not extend through the entire roller.

The application of the bearing device according to the invention is particularly suitable for a Venetian blind with narrow lamellae, which Venetian blinds have a correspondingly narrow head rail.

I claim:

1. A bearing device for an operating shaft of a Venetian blind, said bearing device having substantially a U shape, at least two resilient legs forming the upstanding portions of said U shape, a roller rotatably mounted between said legs, said roller having a hole for accommodating an operating shaft, said legs having chamfered free ends, the smallest distance between the chamfered free ends of said free legs being less than the length of the roller fitting between said legs.

2. A bearing device for an operating shaft of a Venetian blind, said bearing device having a substantially U shape, a roller rotatably mounted in said device, said roller having a hole for accommodating an operating shaft, the upstanding portions of said bearing device having resilient legs, each of said legs having a recess for supporting the roller therebetween and having a chamfered free end, the smallest distance between the chamfered free ends of said legs being less than the diameter of the roller fitting therebetween.

3. A bearing device for an operating shaft of a Venetian blind, said bearing device having substantially an L shape, a roller rotatably mounted in said device, said roller having a hole for accommodating an operating shaft, the upstanding portion of said bearing device having resilient legs forming an accommodating space therebetween for carrying said roller, the smallest distance between said legs being less than the diameter of the rollers fitting in said accommodation space, said legs having re-entered portions.

4. A bearing device for an operating shaft of a Venetian blind, said bearing device having substantially a U shape, two spaced resilient legs forming the upstanding portions of said U shape, a roller being rotatably mounted between said legs, said roller having an axial hole therein for accommodating an operating shaft, said legs having inner sides facing each other, each of said inner sides being provided with a recess in each of which an end of the roller is retainably supported, the smallest distance between said inner sides of the legs being less than the length of the roller arranged between said inner sides.

5. A bearing device for an operating shaft of a Venetian blind, said bearing device having substantially an L shape, a roller being rotatably and retainably mounted in said device, said roller having a hole therein for accommodating an operating shaft, the upstanding portion of said L-shaped bearing device having two resilient legs which are spaced apart forming an open accommodation space for carrying said roller between the inner facing sides of said legs, the smallest distance of said open accommodation space being less than the diameter of the roller fitting therein, said roller having two axially spaced annular collars situated on either side of the resilient legs.

6. A bearing device for an operating shaft of a Venetian blind, said bearing device having substantially an L shape, a roller being rotatably and retainably mounted in said device, said roller having a hole therein for accommodating an operating shaft, the upstanding portion of said L-shaped bearing device having two resilient legs which are spaced apart and form an open accommodation space for carrying said roller between the inner sides of said legs, each of said inner sides being provided with an inwardly directed protruding portion, the smallest distance between the inner ends of said protruding portions being less than the diameter of the roller fitting in said accommodation space, said roller having two axially spaced annular collars situated on either side of the resilient legs.

7. A bearing device for an operating shaft of a Venetian blind, said bearing device having substantially an L shape, a roller being rotatably and retainably mounted in said device, said roller having an axial hole therein for accommodating the operating shaft, the upstanding portion of said L-shaped bearing device having two resilient legs which are spaced apart and form an open accommodation space for carrying said roller between the inner sides of said legs, the smallest distance between the inner sides of said open accommodation space being less than the diameter of the roller fitting in said accommodation space, a groove extending about the periphery of said inner sides of said legs, the roller being provided with an annular collar engaging with said groove.

References Cited

UNITED STATES PATENTS

| 2,396,425 | 3/1946 | Hunter | 160—177 |
| 2,868,594 | 1/1959 | Leister | 308—15 |
| 2,999,537 | 9/1961 | Falck | 160—177 |
| 3,042,461 | 7/1962 | Smith | |
| 3,053,368 | 9/1962 | Klahn. | |

FOREIGN PATENTS

| 626,701 | 9/1961 | Canada. |
| 671,799 | 5/1952 | Great Britain. |
| 765,419 | 1/1957 | Great Britain. |
| 788,452 | 1/1958 | Great Britain. |
| 878,112 | 9/1961 | Great Britain. |

DAVID J. WILLIAMOWSKY, *Primary Examiner.*

HARRISON R. MOSELEY, *Examiner.*

P. M. CAUN, *Assistant Examiner.*